United States Patent
Rendleman

(10) Patent No.: US 6,296,190 B1
(45) Date of Patent: Oct. 2, 2001

(54) GAMING CHIP WITH TRANSPONDER AND A METHOD FOR MAKING SAME

(75) Inventor: Thomas G. Rendleman, Olathe, KS (US)

(73) Assignee: Trend Plastics, Inc., Olathe, KS (US)

( * ) Notice: Subject to any disclaimer, the term of this patent is extended or adjusted under 35 U.S.C. 154(b) by 0 days.

(21) Appl. No.: 09/304,169

(22) Filed: May 3, 1999

(51) Int. Cl.[7] .................................................. G06K 19/06
(52) U.S. Cl. ............................. 235/492; 235/487; 463/25
(58) Field of Search .................................. 235/492, 488, 235/487; 463/25, 29, 39

(56) References Cited

U.S. PATENT DOCUMENTS

| | | |
|---|---|---|
| 1,935,308 | 11/1933 | Baltzley . |
| 3,439,439 | 4/1969 | Stimson . |
| 3,670,524 | 6/1972 | Korwin . |
| 3,766,452 | 10/1973 | Burpee . |
| 3,953,932 | 5/1976 | Graves . |
| 3,968,582 | 7/1976 | Jones . |
| 4,399,910 | 8/1983 | Gutentag . |
| 4,435,911 | 3/1984 | Jones . |
| 4,725,924 | 2/1988 | Juan . |
| 4,827,640 | 5/1989 | Jones . |
| 5,166,502 | 11/1992 | Rendleman et al. . |
| 5,763,503 | 6/1998 | Rendleman . |
| 5,895,321 | * 4/1999 | Gassies et al. ........................ 463/29 |
| 6,020,432 | * 2/2000 | Ines et al. ............................ 525/166 |
| 6,021,949 | * 2/2000 | Boiron ................................. 235/492 |

* cited by examiner

Primary Examiner—Michael G. Lee
Assistant Examiner—Daniel St. Cyr
(74) Attorney, Agent, or Firm—Shook, Hardy & Bacon L.L.P.

(57) ABSTRACT

A gaming chip that includes a base ring that defines a central aperture, within which a unitary cup disposed. The cup has first and second recessed cavities therein. A transponder is disposed in one of the first and second cavities and an antenna is disposed in the other of the first and second cavities. The antenna is electrically coupled to the transponder and a cover is secured over the cup to maintain the transponder and the antenna within their respective cavities. A method for making a gaming chip is also provided. The method includes providing a ring that has a central aperture extending therethrough and locating a unitary cup having first and second recessed cavities within the central aperture of the ring. An outer shell is molded about the ring, so that the outer shell and the ring form at least a part of the outer surface of the gaming chip. The outer shell has a lip that extends at least partially over an outer edge of the cup to hold the cup within the ring. A transponder is placed within one of the cavities and an antenna is placed within the other cavity. The transponder is electrically coupled to the antenna and a cover is secured over the cup to maintain the transponder and the antenna within the respective cavities.

12 Claims, 2 Drawing Sheets

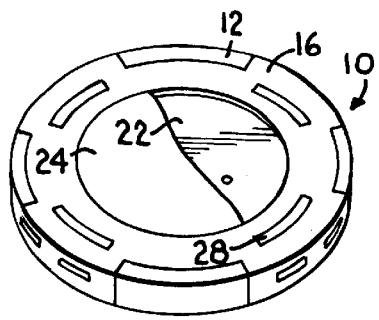
Fig.1.
Fig.3.
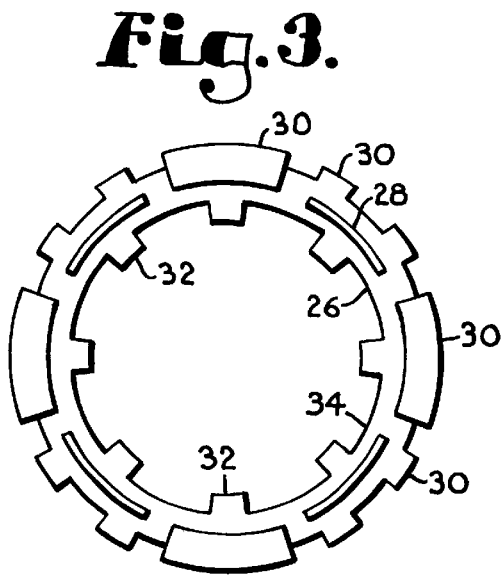
Fig.5.
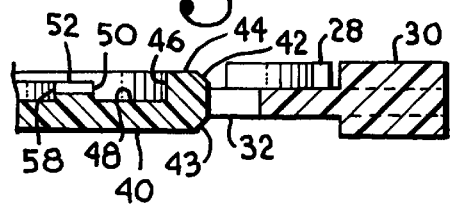
Fig.2.
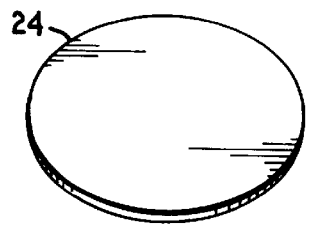
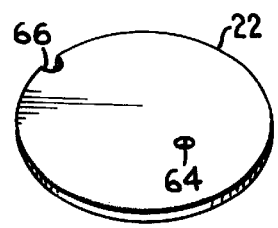
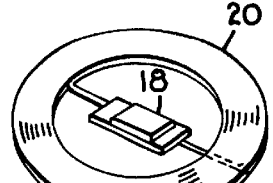
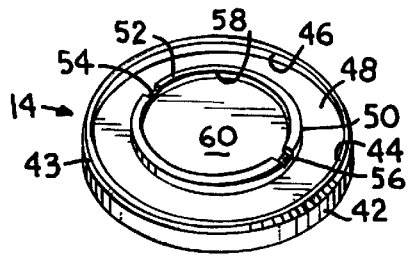
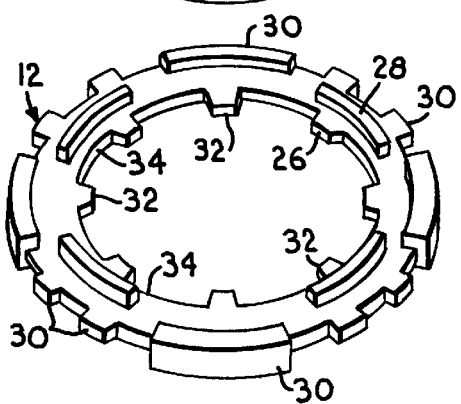
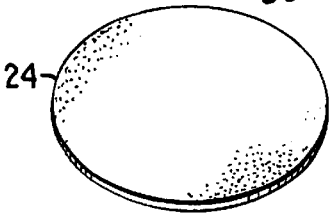

GAMING CHIP WITH TRANSPONDER AND A METHOD FOR MAKING SAME

BACKGROUND OF THE INVENTION

The present invention relates to gaming chips or tokens and the method for making these chips. More specifically, the invention is directed to a method for making a relatively simple and inexpensive gaming chip that contains an implanted transponder configured to hold and transmit predetermined information.

Gaming chips of various denominational values are commonly used in games of chance. These chips are used by patrons to wager a desired amount of money in such a game, and can later be exchanged for currency. Because these chips may be exchanged for currency, there exists a temptation for people to make counterfeit chips or to steal genuine chips. It is known to place transponders within genuine chips to counteract counterfeiters and thieves. These transponders have added advantages in that they are easy to trace, sort and identify. The transponder can store and transmit a variety of information, such as a casino designation, a denominational chip value, a serial number or a date of issue. An example of a gaming chip having a transponder therein is disclosed in U.S. Pat. No. 5,166,502.

An additional problem encountered in manufacturing gaming chips relates to the "feel" of the chip. It has been found that patrons prefer a gaming chip within a certain weight range, typically ten to twelve grams. The challenge is thus to economically manufacture a chip within the desired weight range. In the prior art chips, metal disks are implanted in the chips to achieve the desired weight. For example, the chip disclosed in U.S. Pat. No. 5,166,502 utilizes a mounting vehicle for the transponder that is made out of a brass material. While the brass material does add weight to the chip, it does so in a way that presents certain disadvantages. First, the brass material is relatively expensive, adding to the overall cost of manufacturing the chip. Second, certain portions of the brass mounting vehicle require additional machining, further increasing the cost of the chip. Third, it has been found that certain configurations of the brass material must be used in order to prevent the material from interfering with the operation of the transponder.

Another approach to manufacturing a chip with a transponder therein is to mold the transponder directly into the chip. These chips, without an added weight component, lack the desired weight. Moreover, it has been found that the manufacture of chips in this manner results in an undesirably high scrap rate. It is thought that the higher temperatures and pressures of the molding process damage the transponder contained within the chip.

Therefore, a chip is needed that overcomes the above drawbacks and disadvantages existing in the prior art. More specifically, a chip is needed that contains a transponder and has a weight within the desired range. Further, a method is needed for more economically making a chip, within the desired weight range and that contains a transponder, with a resulting lower scrap rate.

BRIEF SUMMARY OF THE INVENTION

It is an object of the present invention to provide a method for making a gaming chip having a transponder therein that results in a reduced scrap rate over previous methods.

It is another object of this invention to provide a method for making a gaming chip of a more simplified and lower cost construction.

It is a further object of the invention to provide a method for making a gaming chip that results in a chip having a higher and more desirable weight without increasing the cost of making the chip.

It is yet another object of the invention to provide a method for making a chip that does not interfere with transponder signals.

It is still another object of the invention to provide an economically manufacturable gaming chip having a transponder therein that has a higher and more desirable weight.

According to the present invention, the foregoing and other objects are attained by a gaming chip that includes a base ring that defines a central aperture, within which a unitary cup disposed. The cup has first and second recessed cavities therein. A transponder is disposed in one of the first and second cavities and an antenna is disposed in the other of the first and second cavities. The antenna is electrically coupled to the transponder and a cover is secured over the cup to maintain the transponder and the antenna within their respective cavities. According to another aspect of the present invention, a method for making a gaming chip is also provided. The method includes providing a ring that has a central aperture extending therethrough and locating a unitary cup having first and second recessed cavities within the central aperture of the ring. An outer shell is molded about the ring, so that the outer shell and the ring form at least a part of the outer surface of the gaming chip. The outer shell has a lip that extends at least partially over an outer edge of the cup to hold the cup within the ring. A transponder is placed within one of the cavities and an antenna is placed within the other cavity. The transponder is electrically coupled to the antenna and a cover is secured over the cup to maintain the transponder and the antenna within the respective cavities.

Additional objects, advantages, and novel features of the invention will be set forth in part in the description which follows, and in part will be apparent to those skilled in the practice of the invention. The objects and advantages of the invention may be realized and attained by means of the instrumentalities and combinations particularly pointed out in the appended claims.

BRIEF DESCRIPTION OF THE DRAWINGS

In the accompanying drawings which form a part of this specification and which are to be read in conjunction therewith and in which like reference numerals are used to indicate like parts in the various views:

FIG. 1 is a perspective view of the chip of the present invention, with parts being broken away to show particular details of construction;

FIG. 2 is an exploded view of the chip of FIG. 1 absent the molded outer shell;

FIG. 3 is a top plan view of one component of the chip of FIG. 1;

FIG. 5 is a partial cross-sectional view taken along line 5—5 of FIG. 4;

DETAILED DESCRIPTION OF THE INVENTION

Figure 4:
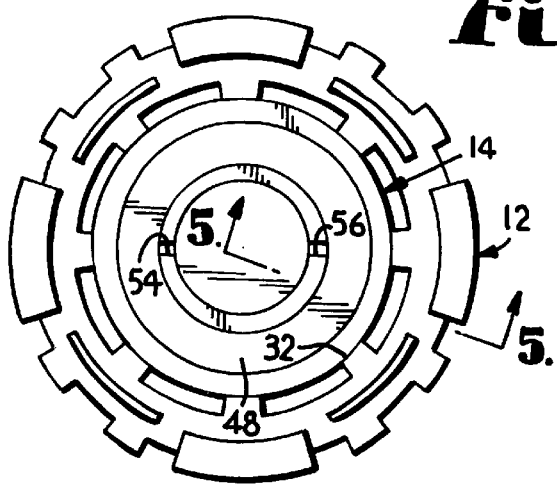
FIG. 4 is a top plan view of the chip of FIG. 1 in a partially assembled state.

Referring initially to FIG. 1, a gaming chip according to the present invention is broadly designated in the drawings by the reference numeral 10. Chip 10 includes a plastic ring 12, as best seen in FIGS. 1 and 2, a transponder cup 14 and a molded outer shell 16. Cup 14 holds a transponder 18 and an antenna 20, as is more fully described below. A cover 22 is placed over the open end of cup 14 and is held in place with an epoxy material. A label 24 identifying the particular casino is adhesively secured over cover 22 on one side of chip 10 and over the bottom of cup 14 on the opposite side of chip 10.

As best seen in FIG. 2, ring 12 defines an inner open area 26, into which cup 14 is placed, as is more fully described below. Extending from the top in bottom surfaces of ring 12 are raised axial projections 28. As shown, projections 28 are arcuate segments. However, projections 28 can be of any desired shape, and can include numbers and letters. For example, projections 28 could be used to spell the name of a casino or could be used to signify the denominational value of chip 10. Ring 12 also has spaced radially extending projections 30 around its outer periphery. Projections 30 can define a series of spaced recessed portions, into which a number of inserts can be placed. These inserts are preferably of a different color than ring 12 and outer shell 16. The provision of the inserts enhances the difficulty in counterfeiting chip 10, as is known to those of skill in the art. Open area 26, as best seen in FIG. 3, has a number of spaced tabs 32 that extend radially inward. Tabs 32 define the innermost diameter of area 26, and are used to initially hold cup 14 in place, as is more fully described below. Tabs 32 define a number of spaced recesses 34 that will be filled when outer shell 16 is formed.

Figure 7:
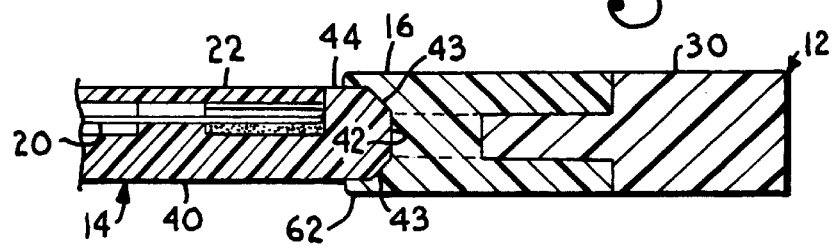
FIG. 7 is a partial cross-sectional view taken along line 7—7 of FIG. 6.

Cup 14 has a lower, relatively smooth surface 40 and an outer edge wall 42 extending upwardly therefrom. Wall 42 terminates at a first upper surface 44 that extends inwardly from wall 42 in generally parallel orientation to surface 40. As best seen in FIG. 7, wall 42 may be provided with an upper and a lower chamfer 43. Chamfer 43 provides an additional holding surface and helps to hold cup 14 in place after molding. Spaced from wall 42 and extending downwardly from surface 44 is a first inner wall 46 that is concentric with wall 42. An antenna channel 48 extends radially inwardly from wall 46 and is generally parallel to surfaces 40 and 44. Channel 48 is thus defined on one side by wall 46 and on the radially inward side by a second inner wall 50. As best seen in FIG. 5, wall 50 is concentric with walls 42 and 46. Extending radially inwardly from wall 50 is a second upper surface 52. As best seen in FIG. 5, upper surface 52 is spaced below surface 44 but is parallel thereto. Preferably, surface 52 is spaced below surface 44 in an amount equal to the thickness of plastic cover 22. This enables cover 22 to be flush with surface 44 after it has been installed in cup 14, as is more fully described below. Surface 52 preferably has a channel 54 formed therein on one side, and a second channel 56 formed therein directly opposite channel 54. One of channels 54 or 56 may be provided with a pair of spaced wire channels (not shown) that operate to house connecting wires from antenna 20. Channels 54 and 56 preferably do not extend completely to the surface of antenna channel 48. Surface 52 terminates at a downwardly extending third inner wall 58. Wall 58 is concentric with walls 46 and 50, and defines a transponder cavity 60, as best seen in FIGS. 2 and 5.

Cup 14, as described above is thus formed to accommodate antenna 20 and transponder 18. It should be understood that while cavity 60 is shown as being generally circular in shape, other shapes could be used, so long as transponder 18 fits within the cavity. Cup 14 is molded from a heavily filled plastic material which preferably has a specific gravity of about 10. A suitable material for cup 14 is available from LNP Plastics of Exton, Pennsylvania, sold under the name THERMOCOMP, model HSG-P-1000A.

Figure 6:
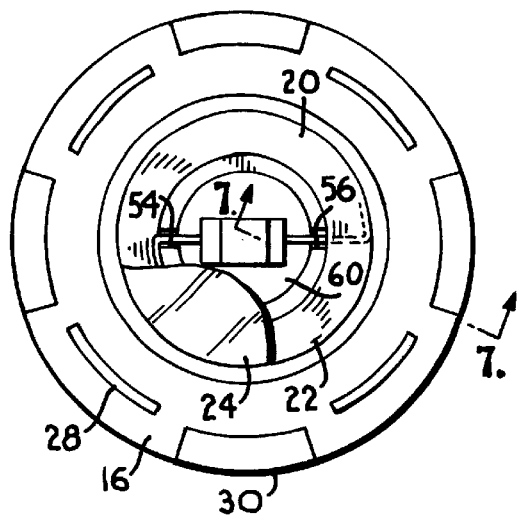
FIG. 6 is a top plan view of the chip of FIG. 1, with parts being broken away to show particular details of construction.

Outer wall 42 of cup 14 is sized to fit within the innermost diameter of open area 26 that is formed by tabs 32. Preferably, cup 14 is sized to be frictionally held in ring 12 by tabs 32. After cup 14 has been placed in ring 12, outer shell 16 is molded around the assembly of the ring and cup. As seen in FIGS. 6 and 7, outer shell 16 is formed to complete the outer portion of chip 10. Chamfers 43 assist in holding cup 14 in place after shell 16 is molded therearound. Projections 28 and 30 are sized so that the outermost surfaces thereof are flush with the outer surface of shell 16. Therefore, projections 28 and 30 form a pattern within outer shell 16. This pattern can display, for example, a design, a casino name or a denominational value for the chip.

As best seen in FIG. 7, outer shell 16 has a lip 62 that extends over first upper surface 44 and over lower surface 40 of cup 14. Lip 62 thus operates to further secure cup 14 within chip 10. Preferably, cup 14 is positioned relative to shell 16 such that cup 14 is slightly recessed from both the upper and lower surfaces of shell 16. This recessed positioning allows labels 24 to be applied to chip 10 so that they are generally flush with the adjacent surface of shell 16. Shell 16 is thus molded so that plastic ring 12, cup 14 and shell 16 are a unitary, one-piece structure.

As described above and as best seen in FIG. 6, transponder 18 is located within cavity 60 of cup 14. A suitable transponder is one manufactured by Philips and sold under the name HITAG, model number HTC MOA2S31, it being understood that other transponders are acceptable so long as they can hold and transmit the desired data of chip 10. Antenna 20 is electrically coupled to transponder 18 and is placed within channel 48, with the connecting wires resting within channels 54 or 56. Disposed on top of cup 14 and directly over transponder 18 and antenna 20 is plastic cover 22. Cover 22 is of a diameter that is generally equal to the diameter defined by first inner wall 46, so that cover 22 is frictionally held within cup 14. When in place, cover 22 rests against upper surface 52 and is generally flush with upper surface 44 of cup 14. As best seen in FIG. 2, cover 22 is equipped with a through hole 64 that is located so as to be above cavity 60. A vent 66 is also located within cover 22 and is located along the outermost edge of cover 22. As seen in FIG. 2, vent 66 is shown as being semi-circular in shape, although other shapes would be suitable.

An epoxy material is injected through hole 64 to positively hold transponder 18 and antenna 20 in place, as well as to secure cover 22 in place. Preferably, cover 22 is made of a transparent material to allow the epoxy material to be cured, such as with an ultraviolet light. Labels 24 are then adhesively applied to chip 10 to complete its overall appearance. Chip 10 thus incorporates a transponder and is held within cup 14. Because cup 14 is made from a molded plastic material, no machining of the part is required and signals from transponder 18 are not interfered with by cup 14. Moreover, because cup 14 is molded with a heavily filled plastic material, cup 14 provides the desired weight to chip 10 without the need for the use of a relatively expensive machined brass material.

In the method for making chip 10, plastic ring 12 and cup 14 are first molded into the desired shapes described above. Cup 14 is then located within open area 26 of ring 12 and is axially centered within ring 12. Thereafter, the ring and cup assembly is placed within a mold where outer shell 16 is formed. After shell 16 is molded, the assembly has the rough appearance of chip 10. At this stage, transponder 18 is placed within cavity 60 and antenna 20 is placed within channel 48. Antenna 20 is electrically connected to transponder 18 either before or after being placed within cup 14. The wires connecting antenna 20 to transponder 18 are placed within wire channels 56 to protect the wires. After the transponder and the antenna are in place, cover 22 is placed within cup 14 so that it rests on surface 52 and so that it is surrounded by wall 46. Thereafter, an epoxy is injected under cover 22 through hole 64. A sufficient amount of epoxy is used to hold transponder 18, antenna 20 and cover 22 in place. The epoxy is then exposed to a curing agent, such as ultraviolet light, to cure the epoxy. After the epoxy has cured, the final step ill making chip 10 is to apply labels 24. Preferably, labels 24 are adhesively secured to each side of chip 10.

The above described method alleviates the scrap problems encountered by directly molding the transponder and antenna into chip 10. In the method described above, the transponder and antenna are not subjected to the increased pressures and temperatures experienced during molding. Further, the above described chip includes an integral transponder while maintaining a relatively simple and inexpensive construction. By providing a molded transponder cup, designed as described above, and made from a heavily filled plastic material, the need for expensive brass parts is eliminated. Surprisingly, it has been found that the use of the heavily filled plastic material actually results in a heavier chip 10, achieving a better "feel" for the gaming patron. Also, the use of the heavily filled plastic material offers less interference to the transponder signal than is encountered when brass parts are used.

From the foregoing, it will be seen that this invention is one well adapted to attain all of the ends and objects hereinabove set forth, together with other advantages which are inherent to the structure. It will be understood that certain features and subcombinations are of utility and may be employed without reference to other features and subcomnbinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A gaming chip, comprising:
   a base ring defining a central aperture;
   a unitary cup disposed within said aperture, said cup having first and second recessed cavities therein;
   a transponder disposed in one of said first and second cavities;
   an antenna disposed in the other of said first and second cavities, said antenna being electrically coupled to said transponder; and
   a cover secured over said cup to maintain said transponder and said antenna within the respective said cavities.

2. The gaming chip of claim 1, further comprising a first label secured to a back side of said unitary cup and a second label secured to said cover.

3. The gaming chip of claim 1, wherein said base ring includes a central plastic ring about which is molded an outer shell.

4. The gaming chip of claim 3, wherein said outer shell includes a lip that extends at least partially over an outer edge of said cup to hold said cup within said plastic ring.

5. The gaming chip of claim 1, wherein said cup is made from a moldable material having a specific gravity of at least about 8.

6. The gaming chip of claim 5, wherein said cup further includes a wall dividing said first cavity from said second cavity.

7. The gaming chip of claim 6, wherein said dividing wall has disposed therein a pair of wire channels that accommodate electrical wiring extending between said transponder and said antenna.

8. The gaming chip of claim 1, wherein said cover has a first hole disposed therein in a location generally above said transponder, said cover further having a vent hole disposed therein adjacent the perimeter of said cover.

9. A method for making a gaming chip having a transponder therein, the method comprising the steps of:
   providing a ring having a central aperture extending therethrough;
   locating a unitary cup having first and second recessed cavities within said central aperture of said ring;
   molding an outer shell about said ring, said outer shell and said ring forming at least a part of the outer surface of the gaming chip, said outer shell having a lip that extends at least partially over an outer edge of said cup to hold said cup within said ring;
   placing a transponder within one of said first and second cavities;
   placing an antenna within the other of said first and second cavities;
   electrically coupling said transponder to said antenna;
   securing a cover over said cup to maintain said transponder and said antenna within the respective said cavities.

10. The method of claim 9, further comprising placing a label over said cover and over the surface of said cup that is opposite said cover.

11. The method of claim 10, wherein said cover has a first hole disposed therethrough in a location generally above said transponder and a vent hole disposed therethrough generally adjacent a perimeter of said cover, and wherein said securing step includes nnjecting an adhesive filler through said first hole, said adhesive filler acting to secure said cover in place and maintain said transponder and said antenna in place.

12. The method of claim 9, wherein said unitary cup is molded from a material having a specific gravity of at least about 10.

* * * * *